J. J. CHARLEY & F. LAMPLOUGH.
SPRING SUSPENSION FOR VEHICLES.
APPLICATION FILED MAR. 26, 1912.
1,046,553.
Patented Dec. 10, 1912.
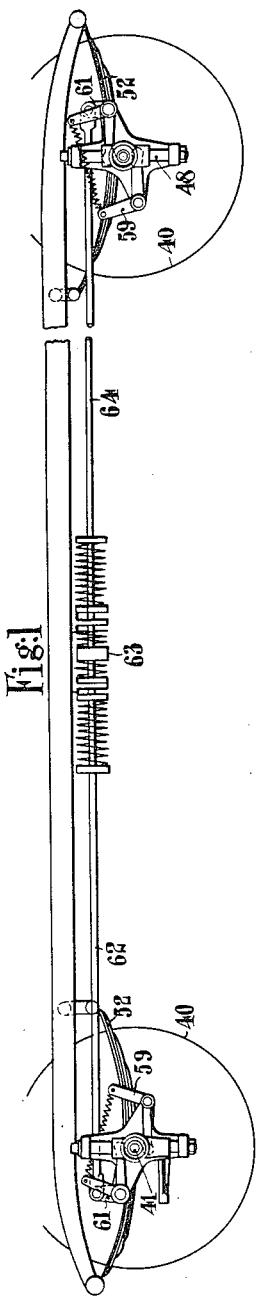
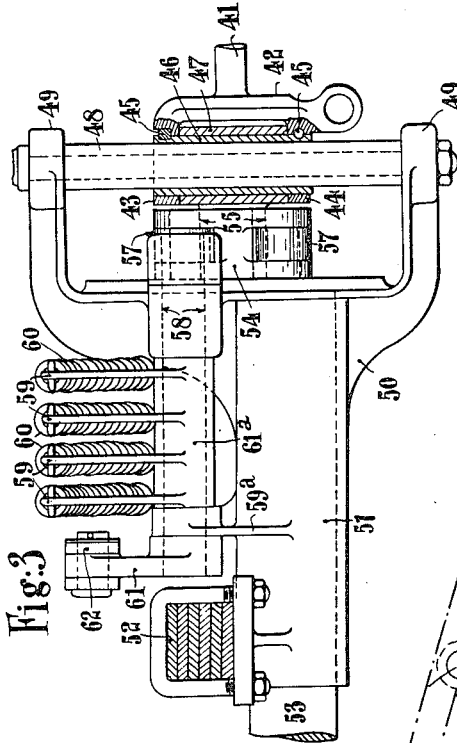
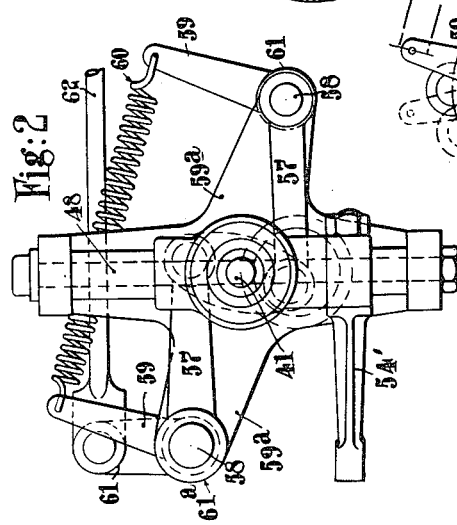
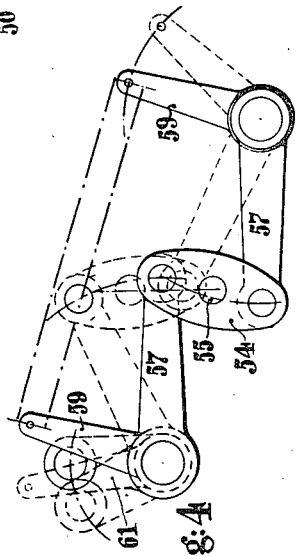
Witnesses:
C. A. Walls
L. G. Anger
Inventors:
John Joseph Charley & Frederick Lamplough
by R. Hadden
Attorney.

UNITED STATES PATENT OFFICE.

JOHN JOSEPH CHARLEY, OF MALVERN, VICTORIA, AUSTRALIA, AND FREDERICK LAMPLOUGH, OF LONDON, ENGLAND; SAID LAMPLOUGH ASSIGNOR TO SAID CHARLEY.

SPRING SUSPENSION FOR VEHICLES.

1,046,553.                    Specification of Letters Patent.       Patented Dec. 10, 1912.

Application filed March 26, 1912. Serial No. 686,444.

*To all whom it may concern:*

Be it known that we, JOHN JOSEPH CHARLEY and FREDERICK LAMPLOUGH, both subjects of the King of England, residing, respectively, at Malvern, in the State of Victoria, Commonwealth of Australia, temporarily of Albany Works, Willesden Junction, London, N. W., England, and Albany Works, aforesaid, have invented a certain new and useful Improvement in Spring Suspension for Vehicles, of which the following is a specification.

This invention relates to improvements in spring suspension for vehicles for absorbing or reducing road shocks and the like, and comprises a modified construction of the pivoted or articulated wheel carrying axle described in the specification of our copending application, filed herewith, which broadly comprises a supporting member in substantially fixed relation to the vehicle body, a wheel carrying member articulated at one end to said supporting member and means for preventing lateral play of the free end of said articulated member during its rocking movements relatively to said supporting member.

The primary object of the invention is to provide means whereby each wheel may be caused to rise and fall relatively to the chassis or fixed axle in a rectilinear direction instead of in a curved path as in the construction of the prior application referred to.

The invention further comprises an arrangement of bell-cranks having one arm of each co-acting with the means for and assisting in the production of the aforesaid rectilinear movement of the axle while the other arms of said bell-cranks act to carry or assist in carrying the weight of the vehicle.

The movements of a wheel due to road inequalities are transmitted by one or other of said bell-cranks through shock absorbing and normalizing devices to a similar arrangement of bell-cranks and axle supporting means for another wheel of the vehicle, such shock absorbing and normalizing devices being appropriately of the kind described in the specification of prior Letters Patent No. 1013742, granted January 2, 1912, to J. J. Charley.

A practical embodiment of the invention is represented in the accompanying drawings in which—

Figure 1 is a side elevation showing as an example the invention applied to the chassis of a road vehicle, the shock absorbing and normalizing means being illustrated diagrammatically. Fig. 2 is a side elevation of the improved wheel supporting and shock transmitting members. Fig. 3 is an end elevation from the left of Fig. 1, certain parts being in section and others removed, and Fig. 4 is a detail view of parts shown in Figs. 2 and 3. Figs. 2 to 4 are drawn to a scale considerably enlarged with reference to Fig. 1.

The invention is herein described and illustrated more particularly with reference to the steering wheels of an automobile road vehicle, each running wheel 40 being rotatably mounted on a stub axle 41 carried by an arm 42 having integral therewith upper and lower lugs 43, 44 respectively which are connected as by keys 45 to a tubular member 46 free to partially rotate in a slide block 47 forming part of the steering knuckle, lateral movement or distortion of these parts being prevented by a guide rod 48 mounted in the bifurcated ends 49 of a bracket 50 integral with a transverse sleeve 51 shown as carried by a laminated suspension spring 52 attached to the vehicle frame. Within the sleeve 51 there is fitted a shaft or axle 53 which extends to the opposite side of vehicle where it carries a similar sleeve on that side connected to a suspension spring. To the arm 42 carrying the stub axle 41 is connected the steering lever, rod, or equivalent 54' connected to similar means on the opposite side of the vehicle by means of the usual connecting link or rod (not shown).

Mounted to rock on the slide block 47 is an oscillating link 54 pivoted at the center of its length on a gudgeon 55 extending from said block and having bifurcated ends in which are pivoted levers 57 mounted on shafts 58 fulcrumed in extensions 59ª of the aforesaid bracket 50, the construction and arrangement being such that as the stub axle 41 rises or falls owing to road inequalities the arm 42, tubular member 46 and block 47 are compelled to travel in a rectilinear vertical path owing to the guide rod 48, during which movement the oscillating link 54 and levers 57 are rocked about their pivotal points. Movement is thus imparted to other levers 59 of which there may be any number according to requirements and the free ends of which are connected by springs 60 adapted to assist in supporting that portion of the vehicle adjacent the wheel in question. The said levers 59, of which there are four shown in Fig. 3, are mounted on sleeves 61ª keyed to the shafts 58 on which the levers 57 are mounted so that in effect the said levers 57 and 59 form bell cranks.

Mounted on the shaft 58 of one of said bell cranks and participating in the movements thereof is an arm 61 to the outer end of which is attached a pull rod 62 leading to the shock absorbing and normalizing devices 63 above referred to which act by means of another rod 64 to transmit such movements to a similar arm 61 at the other end of the vehicle.

Fig. 4 shows in full lines the normal positions of the link 54, levers 57, 59 and arm 61 and in broken lines the positions assumed by these parts on the wheel rising due to encountering an obstruction. In some cases the levers 59 with their connecting springs 60 may be dispensed with while retaining the levers 57 which co-act with the link 54 to compel rectilinear movement of the stub shaft 41 and retaining also the arm 61 connected to the shock absorbing and normalizing means so that the entire shock due to movements of the stub axle is dealt with by said means.

As above stated the foregoing description relates to the suspension of the steering wheels but as regards the stub shafts, bell cranks, oscillating links and various connections, the same equally applies to the rear or driving wheels in the case of an automobile road vehicle, in which case provision must be made for the driving axle and brakes.

What we claim as our invention and desire to secure by Letters Patent of the United States is:—

1. In a vehicle suspension the combination with a supporting member substantially fixed with relation to the vehicle frame, of a vertical guiding member carried by said supporting member, a wheel carrying member mounted on said guiding member for movement relatively to said supporting member in a rectilinear vertical direction, bell crank levers carried by the supporting member and rocked by the vertical movements of the wheel carrying member, springs connecting said bell crank levers, an arm having movements corresponding to those of the aforesaid bell crank levers and a connection from said arm to a shock absorbing and normalizing system carried by the vehicle frame.

2. In a vehicle suspension the combination with a supporting member substantially fixed with relation to the vehicle frame, of a vertical guiding member carried by said supporting member, a wheel carrying member mounted on said guiding member for movement relatively to said supporting member in a rectilinear vertical direction, levers mounted on the supporting member on opposite sides of the wheel carrying member, a link mounted to oscillate on the wheel carrying member and connecting the free ends of said levers, an arm integral with one of said levers and a connection from said arm to a shock absorbing and normalizing system carried by the vehicle frame.

3. In a vehicle suspension the combination with a supporting member substantially fixed with relation to the vehicle frame, of a vertical guiding member carried by said supporting member, a wheel carrying member mounted on said guiding member for movement relatively to said supporting member in a rectilinear vertical direction, bell crank levers mounted on the supporting member on opposite sides of the wheel carrying member, springs connecting the arms of said levers, a link mounted to oscillate on the wheel carrying member and connecting other arms of said levers, an arm integral with one of said levers and a connection from said arm to a shock absorbing and normalizing system carried by the vehicle frame.

4. In a vehicle suspension the combination of a pair of supporting members substantially fixed with relation to the vehicle frame, a vertical guiding member carried by each supporting member, a wheel carrying member mounted on each guiding member for movements relatively to said supporting member in a rectilinear vertical direction, levers carried by each supporting member on opposite sides of the respective wheel carry member, a link mounted to oscillate on each wheel carrying member and connecting the free ends of said levers, arms integral with said levers, a shock absorbing and normalizing system located between the aforesaid supporting members longitudinally of the vehicle and connections from said arms to said system substantially as described.

In witness whereof we have signed this specification in the presence of two witnesses.

JOHN JOSEPH CHARLEY.
FREDERICK LAMPLOUGH.

Witnesses:
 EVANGELINE HAMPTON,
 EUSTACE H. BARKER.